April 14, 1959   J. M. WALTER ET AL   2,881,527
MEASURING DEVICE FOR MACHINE TOOLS
Filed July 11, 1955   3 Sheets-Sheet 1

INVENTORS.
John M. Walter.
BY John H. Worthen.
Wood, Herron & Evans.
ATTORNEYS.

April 14, 1959  J. M. WALTER ET AL  2,881,527
MEASURING DEVICE FOR MACHINE TOOLS
Filed July 11, 1955  3 Sheets-Sheet 2

INVENTORS.
John M. Walter.
BY John H. Worthen.
Wood, Herron & Evans
ATTORNEYS.

INVENTORS.
John M. Walter.
John H. Worthen.
BY Wood, Herron & Evans.
ATTORNEYS.

United States Patent Office 2,881,527
Patented Apr. 14, 1959

2,881,527
MEASURING DEVICE FOR MACHINE TOOLS

John M. Walter, Cincinnati, Ohio, and John H. Worthen, Warwick, R.I., assignors to The G. A. Gray Company, Cincinnati, Ohio, a corporation of Ohio Application July 11, 1955, Serial No. 521,069

2 Claims. (Cl. 33—125)

This invention relates to machine tools of the type having a tool-supporting spindle which is rotatably mounted in an axially movable quill. The invention is directed particularly to an improved measuring device by which movement of the quill toward or from a work table or work piece is indicated in terms of inches or centimeters and fractional parts thereof, such as thousandths.

In machine tools which are adapted to operate upon work pieces of large sizes, such as planer-type milling machines and large boring mills, the rotatable spindle on which the tool is carried is supported in a quill of substantial diameter which is axially movable through a substantial distance, for example, 10 to 15 inches or more, toward or from the movable table of the machine on which the work is mounted. The quill itself is carried in or on a head or saddle which contains drive gearing and the like, and which itself is frequently movable bodily toward or from the table of the machine.

Axial movement of the quill, independently of the head or saddle which supports it, conveniently enables the operator to position the tool at the point or plane required to provide a predetermined dimension on the work piece, as well as to adjust the tool so that it will take a cut of predetermined depth. However, in precision operations as presently conducted on conventional machines, the final exact setting of the tool to produce a given dimension is accomplished largely by cut-and-try procedure; that is, one or more trial cuts are taken followed by gauge block measuring of the surface so produced. In machines of the type described, the quill is moved axially usually through short distances by means of a hand wheel through a threaded screw or drive gearing system, and, in the past, reference indicators have been used or the hand wheel is calibrated in terms of thousandths of an inch. Such systems, if well constructed, are satisfactory to denote quill movement over fractional parts of an inch, but cumulative errors in the gearing or screw thread introduce errors of appreciable degree if the quill is to be moved a substantial distance, such as five or six inches. In such event, fixed measuring rods are now generally used, sometimes in conjunction with a short scale indicator, and there is always danger that such measurements will be inaccurate or that the quill will be moved beyond the limit of movement which the indicator can accept.

The principal objective of this invention has been to provide a dial type indicator apparatus coupled closely and directly to the quill of a machine tool, fully responsive to the movement of the quill in either direction and capable of indicating accurately the extent to which the quill has been moved from one position to another throughout the entire range of movement of the quill.

A further objective of this invention has been to provide a dial type indiactor measuring system useful in conjunction with machine tools of the type described, so constructed and arranged that the dial on which quill movements may be read is positioned directly in front of or adjacent to the quill where it is conveniently visible to the operator of the machine.

A further objective of the invention has been to provide a measuring system having an indicator directly coupled at all times to the quill, so as to be responsive accurately to movement thereof in either direction at all points throughout the range of a quill movement.

In accordance with this invention, an indicator having a rotatable input spindle is mounted on the head or journal of the machine in which the quill is slideable, but in such position that the axis of the input spindle is substantially or generally radial with respect to the quill itself, and the input spindle is coupled directly to the quill by means of a pinion and a rack which have the teeth also positioned substantially or generally on a radial line of the quill. By this arrangement, the indicator is coupled very closely and directly with the quill and is mounted in a position where its dial and pointer elements are directly and conveniently rotatable by the machine spindle. The close coupling which is enabled by the particular disposition of the indicator drive elements eliminates the errors which would otherwise be present through creepage, shaft distortion, and the like of a system wherein the indicator is remote from the point at which the quill is coupled to the indicator drive.

Apparatus illustrating a typical embodiment of the present invention is shown in the accompanying drawings in which.

Figure 1:
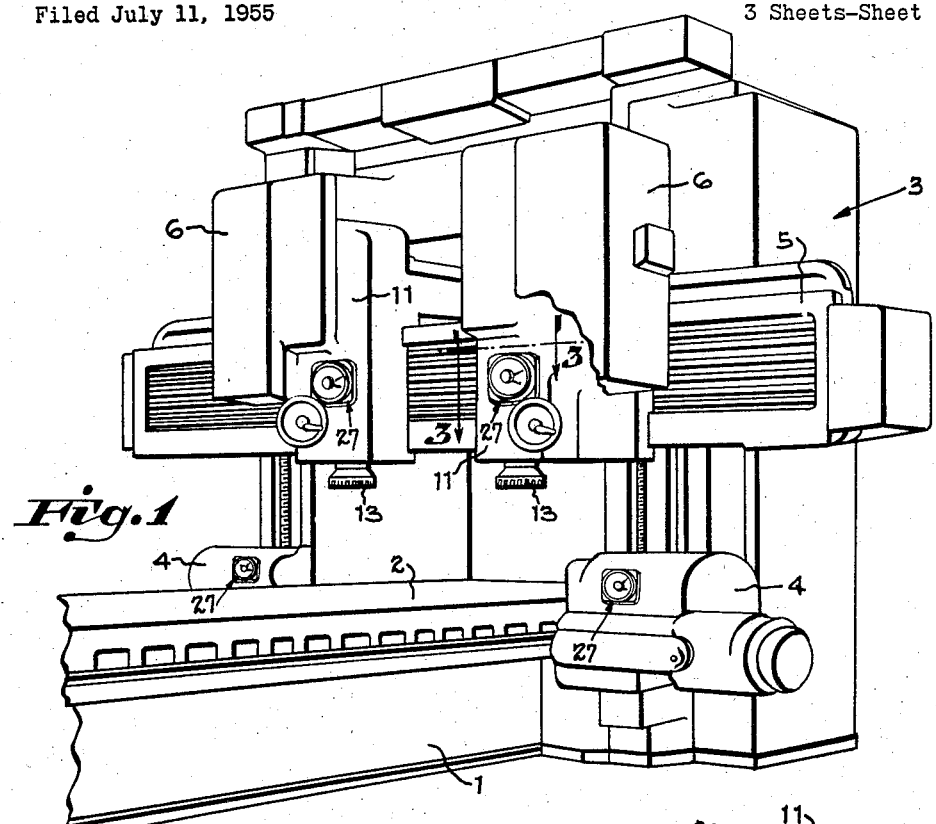
Fig. 1 is a perspective view illustrating a planar-type milling machine having multiple heads, the quill of each of which is equipped with a measuring device of the present invention.

The machine shown in Fig. 1 by way of illustration of the type of apparatus in which the present invention is particularly adapted to be employed, comprises a planer-type milling machine having a bed 1 upon which a table 2 is movable lineally. The bed is straddled by a frame indicated generally at 3 upon which side heads 4, 4 vertically are movable. The frame 3 also carries a vertically movable cross rail 5 which, in turn, slidably supports heads 6, 6 which are movable independently of one another in a horizontal direction. Each of the heads carries a quill 7 therein, and each quill, in turn, rotatably supports a tool driving spindle 9. The quills and spindles in the side heads 4, 4 are positioned horizontally so that the tools operated thereby may engage upon sidewise portions of a work piece fastened to the table 2, while the quills and spindles of the heads 6 on the cross rail are vertically disposed to work generally upon the top surfaces of a work piece. The machine is equipped with the usual provisions for moving the heads along the guide ways, for rotating the spindles in the performance of cuts by the tools, and for axially moving the quills for tool adjustment. These means are generally well understood by those who are skilled in the art, and since they form no part of the present invention, they are not described here in detail. Also, it will be understood that machines less universal than the one shown in Fig. 1 may embody only a single vertical head, a single side head, or various combinations.

Figure 5:
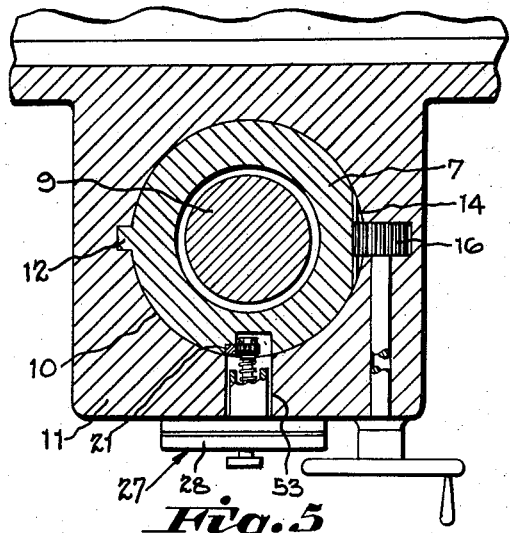
Fig. 5 is a cross sectional view taken on the line 5—5 of Fig. 4.

Each quill in a machine of the type described consists essentially of a large cylinder, slidable in a bore 10 in the head, as indicated at 11 in Fig. 5. The quill is usually provided with a longitudinal slot engaged by a key 12 of the head, so as to prevent rotation of the quill without limiting its axial movement, and the spindle 9 which is rotatably mounted in the quill, is provided at its working end with a taper socket or the like to receive the shank of a tool such as a milling cutter through which machining is conducted. Cutters fastened to the ends of the spindles are shown at 13 in Fig. 1. Axial quill movement may be accomplished by power driven mechanism, by hand, or by both means. For purposes of illustrating the present invention, it is assumed that the quill is provided with chordal rack teeth 14 engaged by a pinion 16 which is driven from a hand wheel; reduction gearing usually employed in the drive system is not shown in the drawings.

Figure 6:
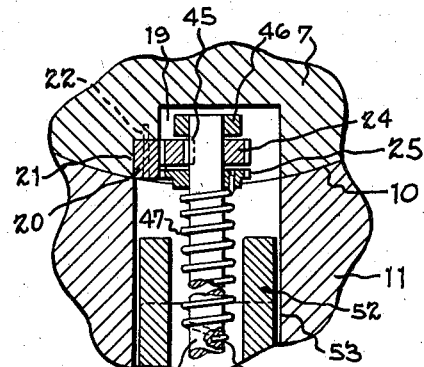
Fig. 6 is an enlarged cross sectional view, similar to Fig. 5, but showing details of construction of the means for imparting quill movement to an indicator drive shaft.
Figure 3:
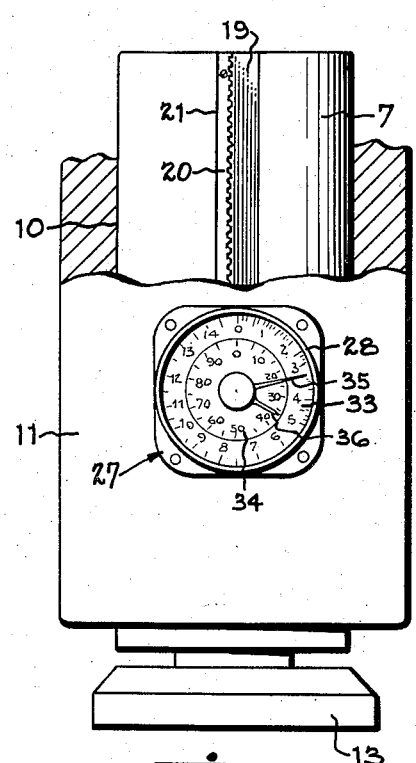
Fig. 3 is a vertical elevation of a machine tool head having a quill equipped in accordance with the present invention.

In accordance with the present invention, the quill 7 is provided with a longitudinal slot 19 in the portion of the quill which is closely adjacent an exterior surface of the head upon which the indicator dial may be mounted, e.g. the front face of the head. A slender rack 20 is fastened in the slot 19 in such a position its teeth extend generally in a radial direction with respect to the quill, as distinguished from the chordal disposition of the teeth 16 through which the quill itself is raised or lowered. Thus, in typical construction, the slot 19 is cut to provide at least one side wall 21 (Fig. 6) and the back of the rack is placed against that side wall thereby disposing the teeth of the rack, at the other side, on axes which intersect or generally approach the quill axis. The rack 20 preferably is pinned at one end to the quill, by means of a dowel pin 22 or the like, so as to fix the location of the rack longitudinally with respect to the quill, and the rack additionally may be cemented in place to hold it firmly in position yet allow for limited expansion without causing warping.

In the construction shown, the teeth of the rack 20 are engaged by pinions 24 and 25 which are mounted upon input shaft 26 of an indicator shown generally at 27. Indicator 27 comprises a housing 28 which is fastened to the head 11 at a suitable face thereof from which the indicator will be readily visible to the operator of the machine. For example, in the apparatus shown, the indicators serving the vertical heads 6 are located thereon at the front faces of the heads, while the indicators serving the side heads 4 are mounted at the sidewise facial portions thereof, each indicator thereby being positioned at a point where it is closely adjacent the tool and readily visible to the operator.

Figure 8:
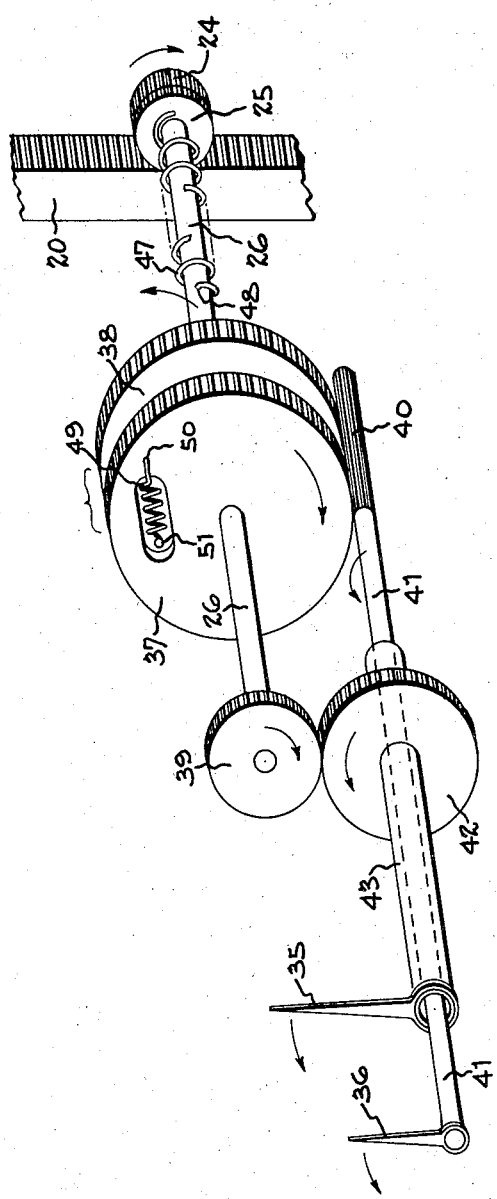
Fig. 8 is a diagrammatic view illustrating one suitable indicator gearing system.

Each indicator 27, in the construction shown, is of the rotatable input shaft type and comprises two dials 33 and 34 respectively, and two pointers 35 and 36 which serve the respective dials 33 and 34. The outer dial, 33 is calibrated in inches with $\frac{1}{10}$ inch subdivisions, and the inner dial is calibrated in $\frac{1}{1000}$ inch divisions. The gearing for the pointer 36 is such that one complete revolution thereof designates $\frac{100}{1000}$ inches, while the gearing for the inch pointer 35 is of any suitable ratio; for example, in the apparatus shown, pointer 35 is driven at a rate whereby it makes one complete revolution when the quill is moved from one extremity of its stroke to the other. Similarly, any suitable gear system may be employed to drive the pointers 35 and 36 from the input shaft 26; one such arrangement is shown diagrammatically in Fig. 8 wherein shaft 26 carries gears 37 and 38 and a separate drive gear 39. Gears 37 and 38, as a pair, mate with a pinion 40 upon a shaft 41 to which the $\frac{1}{1000}$ pointer 36 is fastened. Drive gear 39 meshes with a gear 42 which is fixed upon a sleeve 43 to which the one inch pointer 36 is fastened. Sleeve 43 is journalled on shaft 41. In Fig. 8 the gear sizes have not been shown to scale.

As will be noted from the drawings, the rack 20 is engaged by the pair of pinions 24 and 25 and the pinion 40 is engaged by the pair of gears 37 and 38. In each instance, one member of each pair is fixed upon its shaft and the other member of each pair is biased with respect thereto, so as to eliminate back lash or lost motion from the system. Thus, rack pinion 24 is keyed to shaft 26 by key 45, while the mating pinion 25 is rotatably mounted on shaft 26. However, gear 25 is engaged by the laterally bent portion of a torsion spring 47 which is wound around shaft 26 and which has its opposite end fastened to shaft 26 as by the laterally bent finger 48. In assembly, gear 25 is biased under spring torsion before being brought into engagement with the rack 20 along with pinion 24, and therefore, the teeth on the respective pinions bear under spring pressure against the opposed faces of adjacent rack teeth with which the pinions are mated. Similarly, gear 37 fixed on shaft 26 has a slot cut through it which contains a tension spring 49. Gear 38 is rotatably mounted on shaft 26 and one end of spring 49 is fastened to gear 37, as at 50, while the opposite end of the tension spring is fastened to gear 38, as at 51. The gears 37 and 38 are relatively biased relative to one another before being brought into engagement with pinion 40, and therefore, they likewise present teeth which bear upon the opposite points of adjacent teeth of the pinion 40 so as to take up any lost motion which otherwise might be present. In the preferred construction, the pinions 24 and 25 are biased in a direction opposite the direction in which the gears 37 and 38 are biased.

Figure 4:
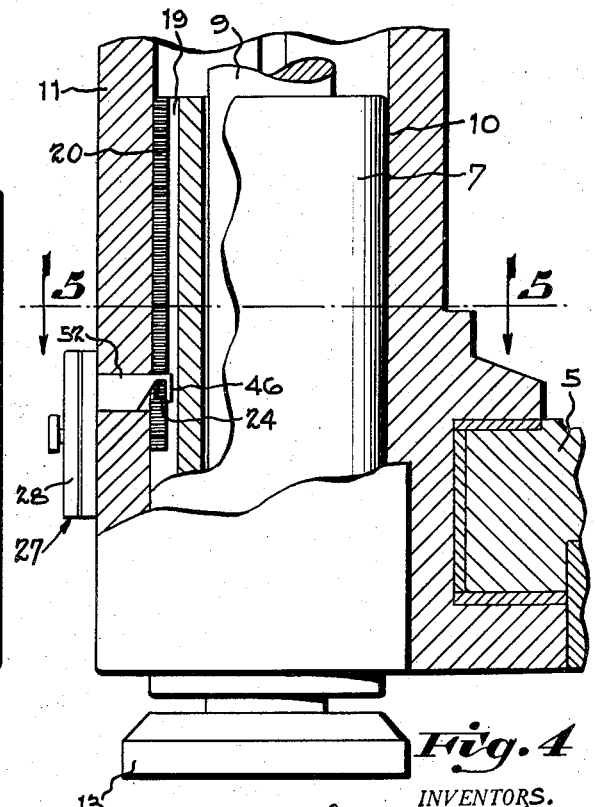
Fig. 4 is a side elevation of the apparatus similar to Fig. 3.

Shaft 26 has its rearward end journalled in the end wall 46 of a sleeve 52 which projects rearwardly from the back face of the housing 28 of the indicator, and the head of the machine on which the indicator apparatus is to be mounted is provided with a short clearance hole 53 (Figs. 5, 6) to receive the drive shaft 26 and/or sleeve 52 of the assembly. In this manner, as is shown in Figs. 4 and 5, the indicator is closely coupled with the quill. By mounting the rack 20 such that its teeth reside substantially radially with respect to the quill, the indicator mechanism may be directly coupled to the rack through the short wall distance between the quill bore and the face of the head. This close coupling eliminates errors which otherwise might be introduced into the system through torsional twist of a long, slender shaft or the like. This close coupling also enables the indicator to be positioned closely adjacent the site at which the tool is brought into machining engagement with the work piece.

Figure 2:
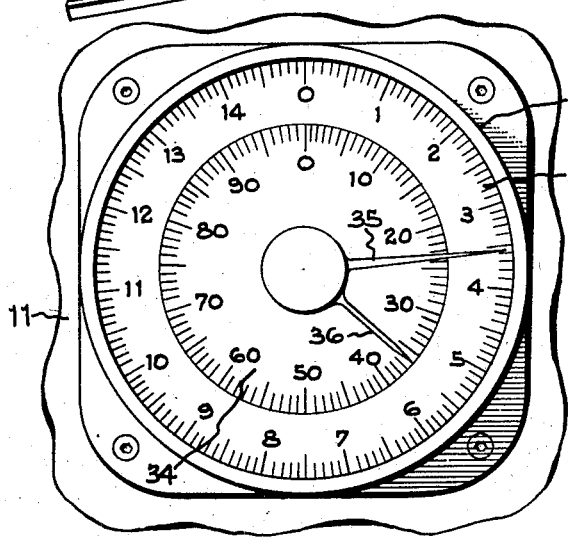
Fig. 2 is a face view of the indicator dial.
Figure 7:
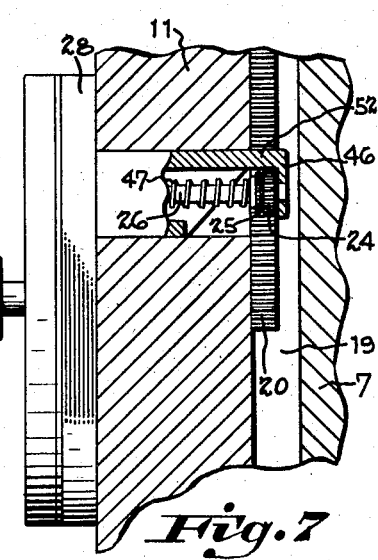
Fig. 7 is a vertical sectional elevation of the indicator drive apparatus.

The indicator is used as a measuring device in the usual way, for example, by taking a first cut, noting the indicator reading which determines the corresponding tool position, then adjusting the tool position by reference to the indicator to take a second cut dimensionally spaced from the first some predetermined distance. If desired, the pointers 35 and 36 on the indicator may be frictionally or magnetically mounted (not shown) so as to be resettable to zero after a given cut is taken, in which event the quill subsequently is moved until the indicator shows that the quills have been moved some predetermined dimensional distance as required on the work piece, after which a second cut is taken. The indicator shown in the drawings is read in the usual way; that is, the inches and $\frac{1}{10}$ inch denoted by the pointer 35, and the $\frac{1}{1000}$ inch denoted by the pointer 36 being added together to give the total reading. Thus, inch indicator 35 shown in Fig. 2 reads 3.5+ inches, while the $\frac{1}{1000}$ inch indicator reads $\frac{36}{1000}$; hence, the total reading of the indicator is 3.536 inches.

Through elimination of back lash and through the accuracy which is provided by the short coupling of the indicator with the quill, relative tool positions are indicated accurately, whether the quill is advanced to different settings progressively in one direction, e.g. downwardly, or whether the tool is moved downwardly so as to be set in one position, then raised after that cut so as to be set in a second position for another cut at another position of the work piece.

Having described our invention, we desire to be limited only by the following claims.

We claim:

1. In a planer-type machine tool comprising a head having a quill axially movable therein and a tool supporting member mounted in said quill for axial motion, said head having an opening therethrough, a dial indicator having a cylindrical housing seated on said head, means attaching said housing to said head, said housing having a cylindrical sleeve projecting through said opening, said sleeve projecting along an axis which is substantially radial with respect to the axis of said quill, said quill having a longitudinal slot extending axially thereof, a rack mounted longitudinally along one side of said slot and having teeth substantially radial with respect to the axis of said quill, said sleeve having an end portion loosely interfitting said slot, said end portion having a rearward wall residing within said longitudinal slot, said dial indicator having a rotatable input shaft extending through said sleeve along the radial axis thereof and having an inner end journalled in the rearward wall of the sleeve adjacent said rack, said sleeve having an inside diameter substantially greater than the diameter of the input shaft, a first input pinion keyed to said input shaft adjacent said wall and in mesh with said rack, a second input pinion rotatably journalled on said input shaft adjacent said first pinion, a coil spring surrounding said input shaft within said sleeve and having one end connected to said shaft and the other end connected to said second pinion, said coil spring rotationally biasing the second pinion relative to the first pinion, a first driving gear fixed to said input shaft within said dial indicator, a second driving gear rotatably journalled on said input shaft adjacent said first driving gear, a tension spring having one end connected to the first driving gear and having its opposite end connected to the second driving gear, said tension spring rotationally biasing said first and second driving gears with respect to one another, a driven pinion meshing in common with said first and second driving gears, a pointer shaft joined to said pinion, and a pointer mounted on said pointer shaft, said dial indicator having a dial serving said pointer, said input pinions and driven gears driving said pointer at a motion increasing ratio providing a precise indication of the axial movement of the quill in either direction.

2. In a planer-type machine tool comprising a head having a quill axially movable therein and a tool supporting member mounted in said quill for axial motion, said head having an opening therethrough, a dial indicator having a cylindrical housing seated on said head, means attaching the cylindrical housing to said head, said housing having a cylindrical sleeve projecting through said opening along an axis which is substantially radial with respect to the axis of said quill, an input shaft rotatably journalled within said sleeve along the axis thereof, said quill having a longitudinal slot extending axially thereof, a rack mounted longitudinally along one side of said slot and having teeth substantially radial with respect to the axis of the said quill, said sleeve having an end portion loosely interfitting said slot and journalling the end portion of the input shaft within said slot, a first pinion keyed to said input shaft and in mesh with said rack, a second input pinion journalled on said input shaft adjacent said first pinion, a coil spring surrounding said input shaft and having one end connected to said shaft and the other end connected to said second pinion, said coil spring rotationally biasing the second pinion relative to the first pinion, a first driving gear keyed to said input shaft, a second driving gear rotatably journalled on said input shaft adjacent said first driving gear, a tension spring having one end connected to the first driving gear and having its opposite end connected to the second driving gear, said tension spring rotationally biasing said first and second driving gears with respect to one another, a driven pinion meshing in common with said first and second driving gears, a pointer shaft joined to said pinion, a first pointer mounted on said shaft, said dial indicator having a dial serving said first pointer, a rotatable pointer sleeve telescopically mounted on said pointer shaft, a second pointer mounted on said sleeve, said dial indicator having a second dial serving said second pointer, and a pair of gears in driving connection between said input shaft and pointer sleeve, said pair of gears driving said sleeve and second pointer through one revolution during movement of the quill in either direction from one end of its limit of travel to the other end while said input pinions and driven gears drive said pointer at a motion increasing ratio providing a precise indication of the movement of the quill in either direction.

References Cited in the file of this patent
UNITED STATES PATENTS

| | | |
|---|---|---|
| 300,038 | Bean | June 10, 1884 |
| 1,617,485 | Hughes | Feb. 15, 1927 |
| 1,820,370 | Aldeborgh et al. | Aug. 25, 1931 |
| 2,052,153 | Willis | Aug. 25, 1936 |